United States Patent [19]

Yamanouchi et al.

[11] Patent Number: 5,430,565
[45] Date of Patent: Jul. 4, 1995

[54] UNIAXIALLY STRETCHED NEGATIVE BIREFRINGENT FILM AND LIQUID CRYSTAL DISPLAY HAVING THE SAME

[75] Inventors: Junichi Yamanouchi; Yosuke Nishiura; Kentaro Shiratsuchi; Satoru Toda, all of Kanagawa, Japan

[73] Assignee: Fuji Photo Film Co., Ltd., Kanagawa, Japan

[21] Appl. No.: 70,173

[22] Filed: Jun. 2, 1993

[30] Foreign Application Priority Data

Jun. 2, 1992 [JP] Japan ............... 4-141408
Jun. 2, 1992 [JP] Japan ............... 4-141409

[51] Int. Cl.⁶ .................................. G02F 1/1335
[52] U.S. Cl. .................................. 359/73; 359/74; 359/500; 428/1
[58] Field of Search ............... 359/73, 74, 494, 500; 428/1; 264/2.6, 176.1

[56] References Cited

U.S. PATENT DOCUMENTS

| | | | |
|---|---|---|---|
| 3,862,880 | 1/1975 | Feldman | 428/910 |
| 4,652,491 | 3/1987 | Gobran | 428/355 |
| 4,857,595 | 8/1989 | Kazmierzak et al. | 525/142 |
| 5,093,739 | 3/1992 | Aida et al. | 359/102 |
| 5,138,474 | 8/1992 | Arakawa | 359/73 |
| 5,164,469 | 11/1992 | Goto et al. | 526/281 |
| 5,189,538 | 2/1993 | Arakawa | 359/73 |
| 5,213,852 | 5/1993 | Arakawa et al. | 359/73 |
| 5,245,456 | 9/1993 | Yoshimi et al. | 359/73 |
| 5,337,174 | 8/1994 | Wada et al. | 359/73 |

*Primary Examiner*—William L. Sikes
*Assistant Examiner*—Tai V. Duong
*Attorney, Agent, or Firm*—Burns, Doane, Swecker & Mathis

[57] ABSTRACT

Disclosed is a uniaxially stretched birefringent film having a negative birefringence, comprising a graft polymer which is obtained by grafting, through addition-polymerization, at least one monomer selected from styrene and derivatives thereof to a polymer having an unsaturated double bond. The liquid crystal display provided with the birefringent film is also disclosed.

14 Claims, 5 Drawing Sheets

BL  P₁  D₁  LC  D₂  P₂

UNIAXIALLY STRETCHED NEGATIVE BIREFRINGENT FILM AND LIQUID CRYSTAL DISPLAY HAVING THE SAME

BACKGROUND OF THE INVENTION

1. Field of the Invention

The present invention relates to a birefringent film employable for a liquid crystal display, and a liquid crystal display provided with the birefringent film.

2. Description of Prior Art

A liquid crystal display can be directly joined to a IC circuit to be driven at low electric voltage and power, and further has various displaying functions and possibilities of making its weight lighter and making its productivity higher. As a result, the use of the liquid crystal display has developed.

A super twisted nematic liquid crystal display (hereinafter referred to as STN-LCD) has been recently utilized for dot-matrix type liquid crystal displays such as those of word processors and personal computers. The liquid crystal display generally has a structure that a liquid crystal cell is disposed between a pair of polarizing sheets. The STN-LCD uses a super twisted nematic liquid crystal showing a twisted angle of not less than 160 degrees. Such STN-LCD has an advantage of showing a high contrast on high multiplexing drive, compared with the conventional twisted nematic liquid crystal display (twisted angle: 90 degrees) which can be utilized for the dot-matrix type liquid crystal displays.

A display screen of the STN-LCD shows an image inherently colored with the hue from green to yellowish red owing to elliptically polarized light transmitted through STN liquid crystal cell. This phenomenon may be hereinafter referred to as coloring. In order to avoid the coloring of the display screen, there have been proposed a liquid crystal display having one or three layers of optically anisotropic body (that is, NTN mode-display) and a liquid crystal display using a uniaxial stretched polymer film (that is, FTN mode-display).

In the NTN mode-display, a linearly polarized light transmitting through one side of a pair of polarizing sheets is changed to the elliptically polarized light almost aligned in the long-axis in the wavelength range of about 400 to 700 nm. Further, the elliptically polarized light is transmitted through the other polarizing sheet, to show a white light without cutting of any wavelength range.

The FTN mode-display utilizes a uniaxial stretched polymer film serving as optically anisotropic body instead of the liquid crystal cell. The former NTN mode-display shows excellent characteristics in black-and-white display. The liquid crystal cell for optically anisotropic body used in the NTN mode-display use is voluminous and a plurality of such cells are required, so that the NTN mode-display is larger in volume and weight, and higher in production cost than the FTN mode-display.

Japanese Patent Provisional Publication No. 63(1988)-189804 proposes, as a uniaxial stretched film for the FTN mode, use of a polycarbonate film which is uniaxially stretched so that a value of retardation measured by a polarizing microscope is set in the range of 200 to 350 nm or 475 to 625 nm. The retardation is defined by the product of birefringence ($\Delta n$) and thickness (d) of the film.

Japanese Patent Provisional Publication No. 63(1988)-167304 discloses a laminated film in which two or more uniaxial stretched films having birefringence are so laminated as to allow their main optic axes to intersect at right angles each other. In the case that two birefringent films (their retardation values are named $R_1$ and $R_2$, respectively) are laminated under the intersection at right angles, the retardation of the composite film (i.e., phase difference film) shows a retardation value of "$|R_1-R_2|$". Such film can be adjusted so that the value of the "$|R_1-R_2|$" is set in the range of 90 to 180 nm, 200 to 350 nm or 475 to 625 nm. Thus, the composite film prevents the display screen from coloring.

The above polymer films (birefringence films (phase difference films)) have been developed for the purpose of the elimination of coloring of the STN-LCD. Thus, the coloring is reduced and the display provided with the film shows almost a black-and-white image. Further, the liquid crystal display utilizing the FTN mode has the advantages of lightweight and low production cost compared with the NTN mode-display as mentioned previously.

As described above, the above liquid crystal display has been improved in elimination of coloring, so far as the coloring view from the direction vertical to the screen is concerned. However, when the liquid crystal display is viewed from an oblique direction, unfavorable viewing angle characteristics such as coloring and disappearance of displayed image are observed.

In more detail, a conventional phase difference film using a polymer having a positive birefringence is adjusted under the following condition:

$$n_{MD} > n_{TD} \geq n_{ND}$$

in which "$n_{MD}$" is a refractive index in a stretched axis direction of a uniaxially stretched film made of a polymer having a positive intrinsic birefringence, "$n_{TD}$" is a fractive index in a direction intersected at right angles to the stretched axis of the film and "$N_{ND}$" is a refractive index in a normal line direction to the surface of the film as shown in FIG. 3.

Hence, in the case that a light is incident perpendicular to the surface of the film, Re (retardation) is represented by the following formula:

$$Re = (n_{MD} - n_{TD})d$$

wherein "d" is a thickness of the film. In the case that a light is incident intersected at right angles to the stretched direction of the film, a birefringence varies between "$\Delta n = n_{MD} - n_{TD}$" and "$\Delta n = n_{MD} - n_{ND}$" with variation of incident angles, where the following relationship:

$$n_{MD} - n_{TD} \leq n_{MD} - n_{ND}$$

is satisfied. Therefore, $\Delta n$ tends to increase (or not to change) with variation of the angles of oblique incidence. On the other hand, an optical path becomes larger due to the oblique incidence, so that "Re ($= \Delta nd$)" also rapidly increases with increase of the angle of the oblique incidence. Further, in the case that a light is incident with tilting to a normal line direction of the film to the stretched direction, $\Delta n$ decreases rapidly from "$n_{MD} - n_{ND}$" to "$n_{ND} - n_{TD}$" so that even increase of an optical path can not compensate decrease of the $\Delta n$, whereby "Re ($= \Delta nd$)" is rapidly decreased with increase of the angle of the oblique incidence. In even uniaxially stretched film which is in principle considered that variation of the retardation (Re) is the least (i.e., in the case of "$n_{MD} > n_{TD} = n_{ND}$"), the Re varies greatly with increase of optical path accompanied by the oblique incidence.

In order to improve the viewing angle characteristics, various studies have been made from the viewpoint of variation of refractive indices in three-dimension directions of the film.

Japanese Patent Provisional Publication No. 2(1990)-256023 discloses as follows. On the basis of findings that the visual angle dependence of the retardation (defined by the product of birefringence ($\Delta n$) and thickness (d) of the film) and the viewing angle of the LCD are closely concerned with each other, the viewing angle characteristics are greatly improved by the use of a film essentially having an optical axis in a normal line direction to the surface of the film, for example, by inserting a laminated film comprising a biaxially stretched film of a polymer having a negative birefringence and a uniaxially stretched film of a polymer having a positive birefringence between a liquid crystal cell and a polarizing sheet.

Japanese Patent Provisional Publication No. 3(1991)-206422 discloses that the viewing angle characteristics are greatly improved by inserting a laminated film comprising a uniaxially stretched film of a polymer having a negative birefringence and a uniaxially stretched film of a polymer having a positive birefringence between a liquid crystal cell and a polarizing sheet.

Japanese Patent Provisional Publication No. 3(1991)-24502 also discloses improvement of the viewing angle characteristics by the use of a laminated film comprising a film of polymer having a negative birefringence and a film of a polymer having a positive intrinsic birefringence. In the above Publications, a polymer used in a film having a negative birefringence is a homopolymer derived from styrene or a copolymer derived from styrene and other monomer(s).

The present inventors have studied to improve the viewing angle characteristics and heat resistance of the copolymer containing a styrene unit from the viewpoint of a structure of the copolymer, copolymerization ratio, or stretching conditions of the copolymer. As a result, phase difference films improved in the above characteristics have been obtained (U.S. Pat. No. 5,213,852).

However, the above-mentioned homopolymers and copolymers derived from styrene (or other monomer) are all relatively brittle, so that the polymers are apt to be ruptured during uniaxial stretching or to be broken during processing such as cutting or punching and further a film of the polymer after incorporated into a liquid crystal display is apt to broken upon receiving variation of temperature.

SUMMARY OF THE INVENTION

It is an object of the present invention to provide a novel uniaxially stretched birefringent film having a negative birefringence greatly improved in physical properties such as brittleness and cracking and variation of birefringence caused by heat.

It is another object of the invention to provide a novel phase difference film greatly improved in physical properties such as brittleness and cracking, variation of birefringence caused by heat, and viewing angle characteristics for a liquid crystal display.

It is a further object of the invention to provide a liquid crystal display provided with a phase difference film which is greatly improved in physical properties such as brittleness and cracking, variation of birefringence caused by heat, and viewing angle characteristics for a liquid crystal display.

There is provided by the present invention a uniaxially stretched birefringent film having a negative birefringence, comprising a graft copolymer (graft polymer) which is obtained by grafting, through addition-polymerization, at least one monomer selected from styrene and derivatives thereof to a polymer having an unsaturated double bond.

Preferred embodiments of the birefringent film of the present invention are as follows:

(1) The birefringent film wherein said polymer having an unsaturated double bond has a recurring unit derived from a monomer having a conjugated diene structure and has a glass transition temperature of not higher than 30° C.

(2) The birefringent film wherein said monomer comprises at least one monomer selected from styrene and derivatives thereof and at least one monomer selected from acrylonitrile and methacrylonitrile.

(3) The birefringent film wherein said addition-polymerization is performed by emulsion polymerization.

(4) The birefringent film wherein said addition-polymerization is performed by suspension polymerization in an aqueous medium.

(5) The birefringent film wherein said grafting is conducted using said polymer having unsaturated double bond in the form of particles having a number-average particle size of not more than 0.3 μm.

(6) The birefringent film which further containing an antioxidant in the amount of 0.01 to 10 weight %.

There is further provided by the invention a liquid crystal display which comprises a liquid crystal cell comprising a pair of substrates provided with a transparent electrode and a twist-orientated nematic liquid crystal sealed therebetween, and at least two birefringent films comprising at least one uniaxially stretched film having a negative birefringence wherein;

said uniaxially stretched film having a negative birefringence comprises a graft copolymer (graft polymer) which is obtained by grafting, through addition-polymerization, at least one monomer selected from styrene and derivatives thereof to a polymer having an unsaturated double bond.

Preferred embodiments of the liquid crystal display of the present invention are as follows:

(1) The liquid crystal display wherein said at least two birefringent films comprise at least one uniaxially stretched film having a positive birefringence and at least one uniaxially stretched film having a negative birefringence.

(2) The liquid crystal display wherein said polymer having an unsaturated double bond has a recurring unit derived from a monomer having a conjugated diene structure and has a glass transition temperature of not higher than 30° C.

(3) The liquid crystal display wherein said monomer comprises at least one monomer selected from styrene and derivatives thereof and at least one monomer selected from acrylonitrile and methacrylonitrile.

(4) The liquid crystal display wherein the addition-polymerization is performed by emulsion polymerization.

(5) The liquid crystal display wherein the addition-polymerization is performed by suspension polymerization in an aqueous medium.

(6) The liquid crystal display wherein said grafting is conducted using said polymer having unsaturated double bond in the form of a particle having a number-average particle size of not more than 0.3 μm.

(7) The liquid crystal display wherein said uniaxially stretched film having a negative intrinsic birefringence further contains an antioxidant in the amount of 0.01 to 10 weight %.

(8) The liquid crystal display wherein said uniaxially stretched film having a negative birefringence further has an adhesion layer containing an antioxidant in the amount of 0.01 to 10 g/m² on the one side or the both sides thereof.

(9) The liquid crystal display wherein the phase difference film is a laminated film comprising a uniaxially stretched film of a polymer having a positive birefringence and a uniaxially stretched film of a copolymer having a negative birefringence, and the stretched axes of the two films intersect at almost right angles each other.

(10) The liquid crystal display wherein the liquid crystal is a twisted nematic crystal liquid or cholesteric liquid crystal.

The uniaxially stretched film of the graft copolymer of the invention has birefringence, and is greatly improved in brittleness and heat-resistance, so that the film is excellent in characteristics needed for a phase difference film such as less coloring and good viewing angle characteristics (e.g., high contrast in a wide range of viewing angles). Particularly, the uniaxially stretched film of the graft copolymer by suspension polymerization is enhanced satisfactorily in productivity.

The liquid crystal display of the invention which employs the above uniaxially stretched film of the graft copolymer, shows a distinct black-and-white image and further is improved in viewing angle characteristics, i.e., contrast in a wide range of viewing angles, coloring or disappearance of display with a slight change of viewing angle. Furthermore, the display has an excellent durability because of good heat-resistance of the phase difference film of the invention.

DETAILED DESCRIPTION OF THE INVENTION

Figure 1:
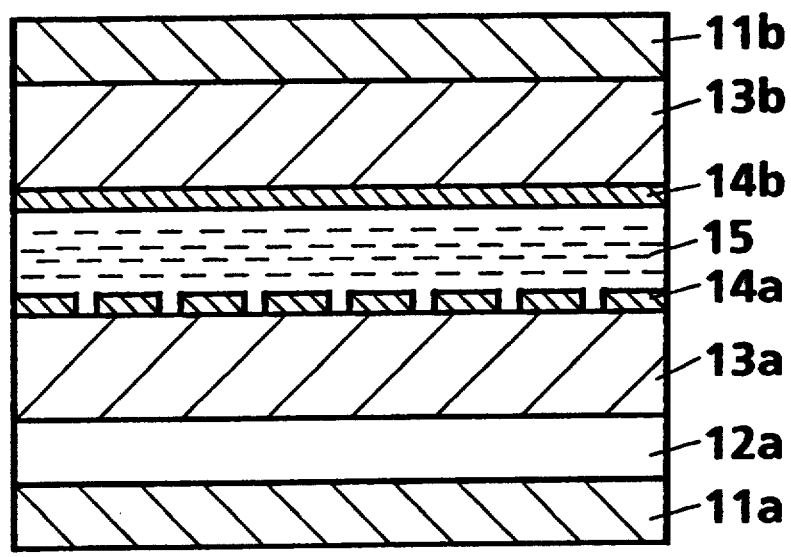
FIG. 1 is a sectional view of one embodiment of the liquid crystal display according to the invention.
Figure 2:
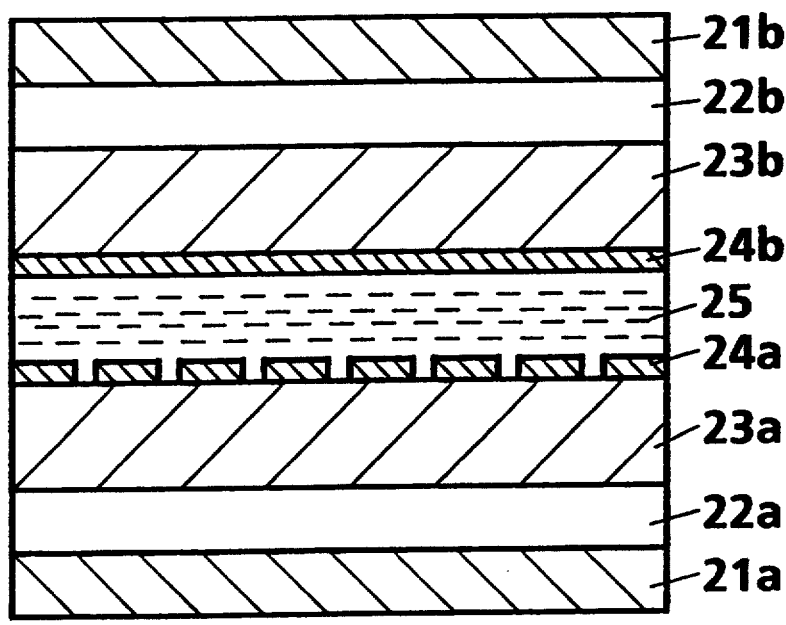
FIG. 2 is a sectional view of another embodiment of the liquid crystal display according to the invention.
Figure 3:
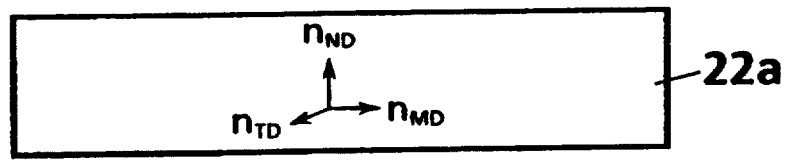
FIG. 3 is a sectional view schematically showing three dimensional directions of a uniaxially stretched film.

The liquid crystal display is described in more detail referring to the attached FIGS. 1 to 2.

FIG. 1 is a sectional view of one embodiment of the liquid crystal display of the invention. Transparent substrates 13a, 13b and transparent electrodes 14a, 14b are superposed, respectively, and the electrodes 14a, 14b are arranged facing each other, between which a twisted nematic liquid crystal 15 is sealed. In this manner, a liquid crystal cell is constructed. The phase difference film (birefringent film) 12a is provided on the substrate 13a of the liquid crystal cell, and polarizing plates 11a, 11b are arranged on the both sides (on the phase difference film 12a and the substrate 13b) of the liquid crystal cell, to constitute the liquid crystal display. The phase difference film may be also provided between the polarizing plate 11b and the substrate 13b. Further, an adhesion layer containing an antioxidant preferably is provided between the phase difference film 12a and the polarizing plate 11a and/or the substrate 13a.

The phase difference film of the invention comprises at least one uniaxially stretched film of a copolymer having a negative intrinsic birefringence (preferably this film and at least one uniaxially stretched film of a polymer having a positive birefringence). Further, the copolymer of a negative intrinsic birefringence is made of a graft copolymer which comprises a trunk polymer having an unsaturated double bond at its main chain or side chain and a branched polymer comprising at least one unit selected from a styrene unit and a styrene derivative unit grafted to the trunk polymer. The phase difference film preferably is a laminated film in which these two films are laminated and the stretched axes of the two films preferably intersect at almost right angles each other. The phase difference film is generally arranged in such manner that the polymer having a positive birefringence is located on the crystal liquid cell side.

FIG. 2 is a sectional view of another embodiment of the liquid crystal display of the invention. Transparent substrates 23a, 23b and transparent electrodes 24a, 24b are superposed, respectively, and the electrodes 24a, 24b are arranged facing each other between which a nematic liquid crystal 25 is sealed, whereby a liquid crystal cell is constructed. On the substrates 23a, 23b of both sides of the liquid crystal cell, phase difference films 22a, 22b and polarizing plates 21a, 21b are provided, respectively, to constitute the liquid crystal display. The phase difference film 22a is a uniaxially stretched film of a polymer having a positive birefringence and the phase difference film 22b is a uniaxially stretched film of a copolymer having a negative intrinsic birefringence. The polymer of a negative birefringence is made of the above graft polymer of the invention. Further, an adhesion layer containing an antioxidant preferably is provided on the one side or the both sides of the phase difference films 22a, 22b.

The present invention is described in more detail below.

The polymer employed for the preparation of the birefringent film of the invention is a graft copolymer (hereinafter referred to as polymer (C)) which is obtained by grafted, through addition polymerization, a monomer (hereinafter referred to as monomer (B)) containing at least one monomer selected from styrene and its derivative to a polymer (hereinafter referred to as polymer (A)) having an unsaturated double bond at its main chain or side chain. The polymerization of the monomer such as styrene gives a branched polymer of the invention.

First, the polymer (A) constituting a trunk of the graft polymer (C) of the invention is described.

The polymer (A) has a recurring unit of an unsaturated double bond at its main chain or side chain. The recurring unit preferably is derived from a monomer having a conjugated diene structure.

Preferred examples of the monomers having the conjugated diene structure include 1,3-butadiene, isoprene, 1,3-pentadiene, 2-ethyl-1,3-butadiene, 2-n-propyl-1,3-butadiene, 2,3-dimethyl-1,3-butadiene, 2-methyl-1,3--pentadiene, 1-phenyl-1,3-butadiene, 1-α-naphthyl-1,3-butadiene, 1-β-naphthyl-1,3-butadiene, 2-chloro-1,3-butadiene, 1-bromo-1,3-butadiene, 1-chloro-1,3-butadiene, 2-fluoro-1,3-butadiene, 2,3-dichloro-1,3-butadiene, 1,1,2-trichloro-1,3-butadiene and 2-cyano-1,3-butadiene. 1,3-Butadiene, isoprene and 2-chloro-1,3-butadiene are particularly preferred.

Further, into the polymer (A), a hydrophobic monomer other than the above monomer having the conjugated diene structure may be incorporated through copolymerization.

Examples of the hydrophobic monomers include ethylene, propylene, 1-butene, isobutene, styrene, α-methylstyrene, vinylketone, monoethylenically unsaturated ester of aliphatic acid (e.g., vinyl acetate or allyl actetate), ester of ethylenically unsaturated mono- or di-carboxylic acid (e.g., methyl methacrylate, ethyl methacrylate, n-butyl methacrylate, n-hexyl methacrylate, cyclohexyl methacrylate, benzyl methacrylate, n-butyl acrylate, n-hexyl acrylate, 2-ethylhexyl acrylate, t-butyl methacrylate, dodecyl methacrylate, 2-hydroxyethyl acrylate, 2-hydroxyethyl methacrylate or 2-hydroxypropyl methacrylate), amide of ethylenically unsaturated mono- or di-carboxylic acid (e.g., t-butylacrylamide or t-butylmethacrylamide), and monoethylenically unsaturated compounds (e.g., acrylonitrile or methacrylonitrile).

Particularly preferred are ethylene, propylene, styrene, α-methylstyrene, ester of acrylic acid or methacrylic acid, acrylonitrile and methacrylonitrile.

The monomer having a conjugated diene structure and the hydrophobic monomer may be employed in two or more kinds, respectively.

The unsaturated structure of the trunk polymer (A) formed by polymerization of the monomer having a conjugated diene structure may comprise cis-1,4-bond, trans-1,4-bond or trans-1,2-bond.

The polymer (A) may be a homopolymer derived from the monomer having a conjugated diene structure or a copolymer derived from the monomer having a conjugated diene structure and the hydrophobic monomer. The copolymer may be a random copolymer obtained by copolymerizing these monomers in any ratio or a block copolymer. The polymer of the conjugated diene monomer and its synthetic method are stated in detail, for example, in "Synthetic Polymer II" (Syunsuke Murahashi, Asakura Shoten, pages 171 to 308, 1975).

Preferred examples of the polymer (A) include styrene-butadiene copolymers (SBR such as solution polymerized SBR (e.g., the above random copolymer, butadiene-styrene block copolymer and styrene-butadiene-styrene block copolymer), and suspension polymerized SBR), butadiene homopolymer (e.g., homopolymer having structure of cis-1,4-bond or trans-1,2-bond, or these structures), isoprene homopolymer (homopolymer having structure of cis-1,4-bond or trans-1,2-bond, or these structures), styrene-isoprene copolymer (e.g., random copolymer or block copolymer), ethylene-propylene-diene copolymer (using diene monomers such as 1,4-hexadiene, dicyclopentadiene or ethylidene norbornene), acrylonitrile-butadiene copolymer, chloroprene homopolymer, isobutylene-isoprene copolymer, butadiene-acrylate copolymer (using acrylate such as ethyl acrylate or butyl acrylate) and butadiene-acrylate-acrylonitrile copolymer (using an acrylate such as ethyl acrylate or butyl acrylate).

The glass transition temperature (Tg) of the polymer (A) greatly influences the characteristics of a phase difference film. The Tg generally is not higher than 50° C., preferably not higher than 30° C., more preferably not higher than 0° C. As the lower limit, the Tg preferably is higher than −110° C. The recurring unit derived from the conjugated diene monomer preferably exists in the polymer (A) in the amount of 10 to 100 wt. %.

The polymer (A) is particularly preferred to be a homopolymer (e.g., polybutadiene or polyisoprene) or a copolymer (e.g., SBR as mentioned above) prepared by emulsion polymerization of the conjugated diene monomer.

Such polymer (A) exists in the form of particle in the emulsion. As mentioned above, the graft copolymer (C) is prepared by grafting monomers such as styrene to the polymer (A). The characteristics of the birefringent film obtained from the polymer (C) greatly depend on the particle size of the above polymer (A). The larger particle size brings about improvement of brittleness of the resultant film, but transparency of the film loweres. Therefore, the liquid crystal device into which such birefringent film is incorporated deteriorates in various characteristics such as contrast. To avoid the deterioration, the number-average particle size of the polymer (A) is preferred to be not more than 0.3 μm, more preferred to be in the range of 0.00001 to 0.3 μm, and particularly preferred in the range of 0.00001 to 0.2 μm.

The monomer (B) which is grafted, through addition polymerization, to the polymer (A) having an unsaturated double to form the polymer (C), is described below.

In the polymer (C) of the invention, the polymer (A) is referred to as "trunk polymer", and therefore a polymer derived from the monomer (B) be referred to as "branched polymer" which is extended in the form of a comb from the polymer (A).

The monomer (B) constituting the branched polymer is at least one monomer containing a monomer selected from styrene and its derivative. Examples of the styrene and its derivatives include styrene, α-methylstyrene, o-methylstyrene, p-chlorostyrene, p-nitrostyrene, p-aminostyrene, p-carboxystyrene, p-phenylstyrene, 2,5-dichlorostyrene and p-t-butylstyrene. Preferred are styrene and a combination of styrene and the styrene derivative other than styrene.

The monomer (B) may contain other monomer other than the styrene and derivative. Examples of other monomers preferably include acrylonitrile, methacrylonitrile, α-chloroacrylonitrile, methyl methacrylate, ethyl methacrylate, methyl acrylate, ethyl acrylate, butyl acrylate, acrylic acid, methacrylic acid, butadiene, isoprene, maleic anhydride, vinyl acetate, ethylene and propylene. Particularly preferred are acrylonitrile and methacrylonitrile. The monomer may be employed singly or in combination together with the styrene or its derivative.

The amount of the trunk polymer (A) in the graft polymer (C) of the invention cannot be unequivocally determined because the physical properties greatly depend on variation of the structure. However, from the consideration of the amount required for improving the physical properties of the film (e.g., too much amount of the polymer (A) renders the film so flexible that the molecular orientation of the film is relaxed in the application of heat), the amount of the trunk polymer (A) in the graft polymer (C) preferably is in the range of 1 to 30 weight %, and more preferably in the range of 3 to 20 weight %.

The graft polymer (C) may have any molecular weight so long as the molecular weight is too small. From the consideration of the viscosity of the polymer solution in the step of forming a film, the molecular weight of the polymer preferably is in the range of 100,000 to 1,000,000, and particularly preferably in the range of 150,000 to 500,000.

The recurring unit derived from the styrene or its derivative preferably exists in the graft polymer (C) in the amount of not less than 50 weight % so as to show birefringence, particularly preferably in the amount of not less than 60 weight %.

The graft polymer (C) of the invention is prepared by conventional radical polymerization method (e.g., emulsion polymerization method, solution polymerization method or suspension polymerization method). The polymerization method is preferred to be emulsion polymerization method or suspension polymerization method. The polymer (C) may be a mixture of two kinds of graft polymers that are different in composition and structure each other. The polymer (C) may contain a polymer other than the graft polymer. Further, the graft polymer (C) may contain a graft polymer and other polymers such as the polymer (A) which undergo no graft polymerization and a random copolymer comprising styrene or its derivative which does not react with the polymer (A).

Preferred examples of the graft polymer (C) are set forth hereinafter according to the following (A) and (B):

(A) polymer having an unsaturated double bond at its main chain or side chain ("trunk")

(B) polymer portion obtained by polymerizing at least one monomer containing at least one monomer selected from styrene and derivatives thereof ("branch"; to be grafted to a polymer having an unsaturated double bond at its main chain or side chain)

The polymer (C) of the invention is not restricted to the above examples.

The number within the parentheses of (A) or (B) stands for the ratio of the monomers by weight, and "(A):(B)" stands for the ratio of the trunk polymer (A) to the branch polymer (B) by weight %.

First, examples of graft polymers obtained by polymerization method such as emulsion polymerization method and solution polymerization method are as follows:

Pe-1 (A):(B)=10:90
   (A) styrene/butadiene copolymer (20/80)
   (B) styrene/acrylonitrile/α-methylstyrene (60/20/20)

Pe-2 (A):(B)=5:95
   (A) styrene/butadiene copolymer (20/80)
   (B) styrene/acrylonitrile/α-methylstyrene (60/20/20)

Pe-3 (A):(B)=10:90
   (A) styrene/butadiene copolymer (20/80)
   (B) styrene/acrylonitrile (80/20)

Pe-4 (A):(B)=7:93
   (A) styrene/butadiene copolymer (20/80)
   (B) styrene/acrylonitrile (80/20)

Pe-5 (A):(B)=12.5:87.5
   (A) styrene/butadiene copolymer (50/50)
   (B) styrene/acrylonitrile (75/25)

Pe-6 (A):(B)=15:85
   (A) styrene/butadiene copolymer (50/50)
   (B) styrene/acrylonitrile/α-methylstyrene (60/30/10)

Pe-7 (A):(B)=10:90
   (A) styrene/butadiene copolymer (50/50)
   (B) styrene/acrylonitrile/α-methylstyrene (60/30/10)

Pe-8 (A):(B)=10:90
   (A) styrene/butadiene copolymer (50/50)
   (B) styrene/acrylonitrile (75/25)

Pe-9 (A):(B)=5:95
   (A) polybutadiene
   (B) styrene/acrylonitrile (70/30)

Pe-10 (A):(B)=10:90
   (A) polybutadiene
   (B) styrene/acrylonitrile/methacrylonitrile (75/15/10)

Pe-11 (A):(B)=12:88
   (A) styrene/butadiene copolymer (50/50)
   (B) styrene

Pe-12 (A):(B)=10:90
   (A) styrene/butadiene copolymer (23/77)
   (B) styrene/methyl methacrylate/acrylonitrile (70/10/20)

Pe-13 (A):(B)=10:90
   (A) polyisoprene
   (B) styrene/t-butylstyrene (70/30)

Pe-14 (A):(B)=10:90
   (A) acrylonitrile/butadiene copolymer (50/50)
   (B) styrene/acrylonitrile (80/20)

Pe-15 (A):(B)=12:88
   (A) acrylonitrile/butadiene copolymer (25/75)
   (B) styrene/acrylonitrile/α-methylstyrene (60/20/20)

Pe-16 (A):(B)=10:90
   (A) ethyl acrylate/butadiene copolymer (50/50)
   (B) styrene/methyl methacrylate (80/20)

Pe-17 (A):(B)=15:85
   (A) ethyl acrylate/styrene/butadiene copolymer (40/30/30)
   (B) styrene/methacrylonitrile (75/25)

The above-mentioned graft polymer of the invention is, for example, prepared in the following manner. The polymer (A) may be prepared by emulsion polymerization or may be a commercially available product. To the polymer (A) dispersed in water, the monomer (B) is added dropwise or in one time at 65° C. in the presence of a redox initiator of potassium peroxide and sodium sulfite, to polymerize them. The resultant graft polymer dispersed in water is allowed to aggregate by addition of a strong acid or salt (e.g., sodium chloride) or freezing-unfreezing process, collected under filtration, and dried. Thus, the polymer (C) is prepared.

The use of the emulsion polymerization method has advantages that the graft polymerization can be carried out at a high polymerization rate to obtain a polymer having a high molecular weight and the resultant graft copolymer is obtained in the form of fine powder to easily dissolve in a solvent such as methylene chloride.

The graft polymer (C) preferably is prepared by suspension polymerization. The use of the suspension polymerization method has advantage that procedures comprising precipitation the obtained latex, filtration and drying are carried out in a short time.

Preferred examples of the graft polymer (C) by emulsion polymerization are set forth below according to the (A) and (B) that have the same meanings as above:

Ps-1 (A):(B)=10:90
    (A) styrene/butadiene copolymer (20/80)
    (B) styrene/acrylonitrile/α-methylstyrene (60/20/20)

Ps-2 (A):(B)=5:95
    (A) styrene/butadiene copolymer (20/80)
    (B) styrene/acrylonitrile/α-methylstyrene (60/20/20)

Ps-3 (A):(B)=9:91
    (A) styrene/butadiene copolymer (22/78)
    (B) styrene/acrylonitrile (80/20)

Ps-4 (A):(B)=7:93
    (A) styrene/butadiene copolymer (20/78)
    (B) styrene/acrylonitrile (80/20)

Ps-5 (A):(B)=10:90
    (A) styrene/butadiene copolymer (40/60)
    (B) styrene/acrylonitrile (75/25)

Ps-6 (A):(B)=10:90
    (A) styrene/butadiene/styrene block copolymer (20/60/20)
    (B) styrene/acrylonitrile (80/20)

Ps-7 (A):(B)=7:93
    (A) styrene/butadiene/styrene block copolymer (20/60/20)
    (B) styrene/acrylonitrile (80/20)

Ps-8 (A):(B)=10:90
    (A) styrene/butadiene/styrene block copolymer (20/60/20)
    (B) styrene/acrylonitrile/α-methylstyrene (70/15/15)

Ps-9 (A):(B)=15:85
    (A) styrene/butadiene copolymer (50/50)
    (B) styrene/acrylonitrile/α-methylstyrene (60/30/10)

Ps-10 (A):(B)=10:90
    (A) styrene/butadiene copolymer (50/50)
    (B) styrene/acrylonitrile/cα-methylstyrene (60/30/10)

Ps-11 (A):(B)=10:90
    (A) styrene/butadiene copolymer (50/50)
    (B) styrene/acrylonitrile (75/25)

Ps-12 (A):(B)=5:95
    (A) polybutadiene
    (B) styrene/acrylonitrile (70/30)

Ps-13 (A):(B)=10:90
    (A) polybutadiene
    (B) styrene/acrylonitrile/methacrylonitrile (75/15/10)

Ps-14 (A):(B)=12:88
    (A) styrene/butadiene copolymer (50/50)
    (B) styrene

Ps-15 (A):(B)=10:90
    (A) styrene/butadiene copolymer (23/77)
    (B) styrene/methyl methacrylate/acrylonitrile (70/10/20)

Ps-16 (A):(B)=10:90
    (A) polyisoprene
    (B) styrene/t-butylstyrene (70/30)

Ps-17 (A):(B)=10:90
    (A) styrene/isoprene/styrene block copolymer (20/60/20)
    (B) styrene/acrylonitrile (70/30)

Ps-18 (A):(B)=8:92
    (A) ethylene/propylene/ethylidene norbornene copolymer (50/45/5)
    (B) styrene/methyl methacrylate (75/25)

Ps-19 (A):(B)=10:90
    (A) acrylonitrile/butadiene copolymer (50/50)
    (B) styrene/acrylonitrile (85/15)

Ps-20 (A):(B)=12:88
    (A) acrylonitrile/butadiene copolymer (25/75)
    (B) styrene/acrylonitrile/α-methylstyrene (60/20/20)

Ps-21 (A):(B)=10:90
    (A) ethyl acrylate/butadiene copolymer (50/50)
    (B) styrene/t-butyl methacrylate (80/20)

Ps-22 (A):(B)=15:85
    (A) ethyl acrylate/styrene/butadiene copolymer (40/30/30)
    (B) styrene/methacrylonitrile (75/25)

The above-mentioned graft copolymer of the invention is, for example, prepared by addition polymerization (suspension polymerization) initiated by an oil-soluble polymerization initiator using an aqueous medium in the presence of a dispersing agent of inorganic salt and/or water-soluble polymer. The graft copolymer preferably is obtained in the form of grains having means particle size of not less than 50 μm. The general method of the suspension polymerization are described in "The experimental method for synthesis of polymer" (Ohtsu and Kinoshita; Kagaku Dojinsya, pages 130 and 146 to 147).

The inorganic salts are employed in suspension polymerization for formation of the graft copolymerization of the invention for the purpose of rendering dispersion stable or preventing monomers used from dissolving in water. Examples of the salts include sodium chloride, potassium chloride, calcium chloride, magnesium chloride, ammonium chloride, sodium sulfate, potassium sulfate, calcium sulfate, magnesium sulfate, ammonium sulfate, aluminium potassium sulfate, sodium carbonate, potassium carbonate and calcium hydrogenphosphate.

Examples of the water-soluble polymers include polyvinyl alcohol (e.g., Shin-etsu Poval available from Shinetsu Chemical Industry Co., Ltd. and Gohsenol available from Nippon Synthetic Chemical Industry Co., Ltd.), polysodium acrylate (Acrylack available from Japan Catalytic Chemical Industry Co., Ltd. and Aronbis and Julymer available from Nippon Junyaku Co., Ltd.), alkaline hydrolysis product of styrene/maleic acid copolymer (Isoban available from Kuraray Co., Ltd. and Hibiswakow available from Nippon Junyaku Co., Ltd.), sodium alginate (Snow Algin available from Fuji Chemical Industry Co., Ltd.) and water-soluble cellulose derivatives (Meiprogat, Keruco SCS, and Guar Gum available from Sansyo Co., Ltd. and NH-K available from Hoechst Japan Co., Ltd.).

It is preferred that calcium hydrogenphosphate, polyvinyl alcohol, polysodium acrylate or alkaline hydrolysis product of styrene/maleic acid copolymer is employed singly or the compound is employed in combination of sodium chloride, potassium chloride, calcium chloride or magnesium chloride.

Preferred examples of polymerization initiators employable for the suspension polymerization of the invention include azobis (cyclohexane-1-carbonitrile), azobis(isobutylnitrile), 2,2'-azobis(2,4-dimethylvalelonitrile), 2,2'-azobis(4-methoxy-2,4-dimethylvalelonitrile), 2,2'-azobis(dimethyl isobutylate), benzoyl peroxide, lauroyl peroxide, tert-butyl peroxide, tert-acyl peroxide, cumyl peroxide, tert-butyl benzoate peroxide and tertbutyl-phenyl acetate peroxide. Particularly preferred are the peroxide-type initiators.

The polymerization generally is performed at a temperature of 0° to 100° C., and preferably 40° to 90° C. The polymerization temperature should be determined, considering the boiling point of the monomers used in the graft polymerization and if necessary, by considering the restriction of a ceiling temperature (a temperature that the ratio of the polymerization rate to the depolymerization rate reach equilibrium).

The synthetic method of the graft polymer of the invention is described in more detail.

The polymer (A) mentioned previously may be prepared by emulsion polymerization or may be a product commercially available as rubber. The polymer (A) preferably is soluble in an organic solvent.

The synthesis of the graft polymer by suspension polymerization is preferred to be performed in the following manner. The polymer (A) is dissolved in the monomer (B), a solvent dissolving the polymer (A) (preferably halogen-type solvent such as chloroform and carbon tetrachloride, benzene, toluene, ethyl acetate and acetone), or the mixture of the monomer (B) and the solvent. This solution is mixed with water or a combination of water and an organic solvent capable of dissolving in water (e.g., methanol, ethanol, n-propanol, 2-propanol and acetone), and the dispersing agent of the inorganic salt and/or water-soluble polymer, and is dispersed, and then polymerization takes place under stirring.

In this case, the monomer (B) may be all mixed with the polymer (A), or its portion may be mixed with the polymer (A). Otherwise, the monomer (B) may be separated from the polymer (A). The mixture of the monomer (B) and the polymer (A) may be initially dispersed in the aqueous medium, or may be dropwise added. Otherwise, the polymer (A) may be dispersed in the aqueous medium, and then the monomer may be dropwise added to the aqueous medium. The polymerization initiator may be added to the aqueous medium in one time or divisionally, or may be previously added to the aqueous medium.

The uniaxially stretched birefringent film having a negative birefringence of the invention, comprises a graft polymer which is obtained by grafting, through addition-polymerization, at least one monomer selected from styrene and derivatives thereof to a polymer having an unsaturated double bond such as styrene/butadiene copolymer (SBR) mentioned above. Use of the polymer of which typical example is the SBR, brings about improvement of brittleness of the phase difference film.

In contrast, the polymer having an unsaturated double bond is apt to be deteriorated by energy of light or heat in air. Similarly, the uniaxially stretched birefringent film of the invention is also increased in brittleness if exposed to light or heat for a long time. Accordingly, the film preferably contains an antioxidant to prevent increase of brittleness.

Preferred examples of materials of the antioxidant include stabilizers employed for unvulcanized rubber such as SBR (e.g., hindered phenol compounds, amine compounds and imidazole compounds). Further, preferred examples of materials employed together with the stabilizer include phosphite compounds and sulphur containing compounds.

These compounds are described in "Encyclopedia of Chemical Technology" (K. Osmer; 3rd edition, vol. 14, page 404), "Rubber Chemical Technology" (vol. 36, page 1497, (1963)) and "Rubber Chemical Technology" (vol. 59, page 842, (1986)).

Preferred examples of the antioxidant are as follows:

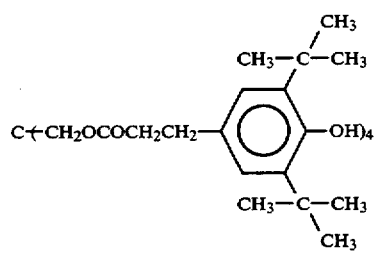

S-1

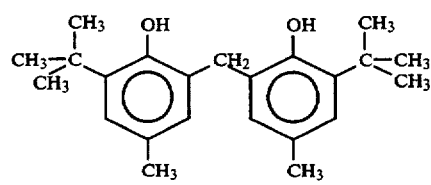

S-2

-continued
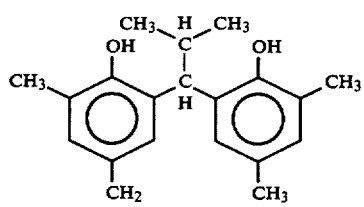
S-3
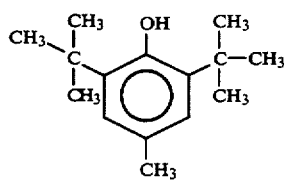
S-4
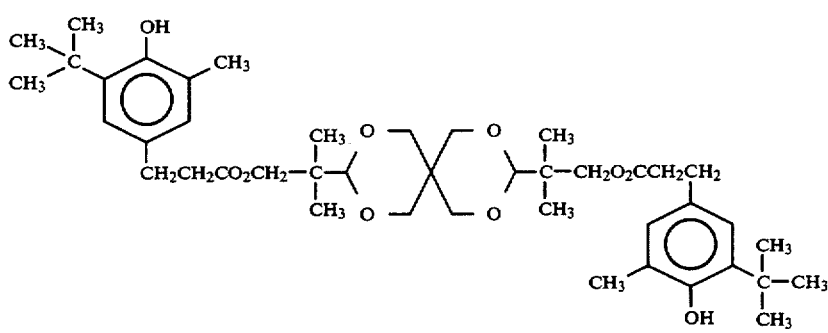
S-5
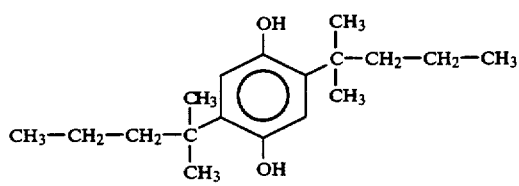
S-6
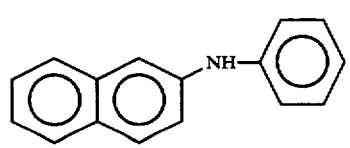
S-7
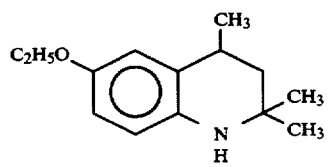
S-8
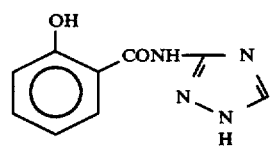
S-9
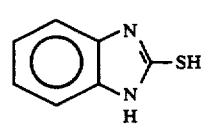
S-10

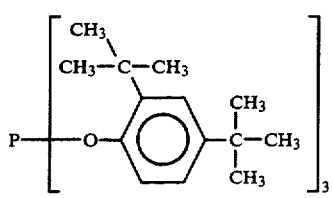

S-11

S+CH₂CH₂CO₂C₁₃H₂₇)₂  S-12

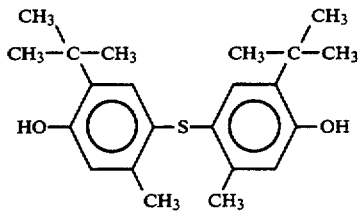

S-13

These antioxidants are generally contained in the uniaxially stretched phase difference film in the range of 0.01 to 10 weight %, preferably in the range of 0.05 to 10 weight %, and more preferably in the range of 0.05 to 5 weight %. The antioxidant may be employed singly or in combination. Particularly, the hindered phenol compound and the phosphite compound are preferably employed in combination.

Figure 8:
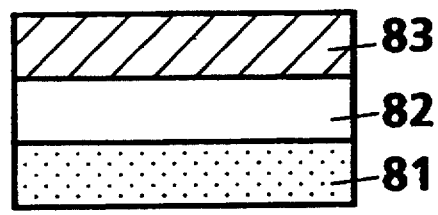
FIG. 8 is a sectional view of one embodiment of a phase difference plate.

The birefringent film of the invention generally is incorporated into the liquid crystal device in the form of a phase difference plate comprising the uniaxially stretched phase difference film having a negative birefringence 81, an adhesive layer 82 and a polarizing sheet 83 as shown FIG. 8.

Materials for the polarizing sheet are not restricted and any material can be employed. Generally, a polarizing film or a polarizing film reinforced or protected with resin or glass are employed. The polarizing film is, for example, formed by treating a hydrophilic polymer such as a stretched polyvinyl alcohol film with iodine or dichroic dye.

Materials for the adhesion layer are not restricted and any material can be employed. Polymers having good transparency such as rubber (e.g., SBR), silicone or acrylic resin are preferably employed.

The phase difference plate shown in FIG. 8 can be provided on the glass plate through the adhesive layer as is previously shown in FIG. 1 or 2. In this case, the adhesive layer is provided on the both side of the phase difference film. The adhesive layers preferably contain the antioxidant to prevent the film from deterioration by light and heat. The antioxidants are generally contained in the adhesive layer in the range of 0.01 to 10 g/m², preferably in the range of 0.05 to 10 g/m², and more preferably in the range of 0.05 to 5 g/m². As materials of the antioxidant, the hindered phenol compound and the phosphite compound are preferred.

In the phase difference film (birefringence film) according to the present invention, for example, a composite film formed by laminating a uniaxially stretched film of a polymer having a positive birefringence on a uniaxially stretched film of a copolymer having a negative intrinsic birefringence, variation of the retardation in all directions of oblique incidence on the composite film can be freely controlled so that the sum of retardations of the uniaxially stretched films in the normal line direction is not compensated each other. Therefore, optional films such as a film which is extremely small in variation of the retardation in all the directions of the oblique incidence and a film having appropriate retardations can be easily produced. The above effect is advantageously obtained in the case that the uniaxially stretched film of a polymer having a positive birefringence and the uniaxially stretched film of a copolymer having a negative intrinsic birefringence are used for lamination so that the stretched axes of the two films intersect at almost right angles each other.

In the above composite film, it is possible to make dependence on viewing angle of the retardation as little as possible by controlling molecular orientation of each uniaxially stretched film through change of stretching conditions, or to make the dependence to appropriately change in the similar manner. Hence, the viewing angle characteristics of the composite film can be suited to any optical characteristics of STN-LCD. Further, the liquid crystal display (STN-LCD), in which the composite film is interposed between a polarizing sheet and a liquid crystal cell, is greatly improved in viewing angle characteristics.

In this way, the liquid crystal display of the invention enables improvement of viewing angle characteristics and enlargement of high contrast area as well as elimination of coloring caused by birefringence of a liquid crystal cell using a twisted nematic liquid crystal with the twisted angles of not less than 90 degree, particularly in the range of 180 to 330 degrees and a liquid crystal cell using a cholestric liquid crystal.

Retardation in a normal line direction of the composite film (laminated film) is expressed by the sum of retardation of the uniaxially stretched film of a copolymer having a negative birefringence and that of the uniaxially stretched film of a polymer having a positive intrinsic birefringence. However, it is not preferred that the stretched axis of the above polymer having positive intrinsic birefringence and that of the copolymer having negative birefringences are coincident with each other, because the obtained retardation disappears by compensation of their retardations. Accordingly, the axes of the films constituting the composite film are preferably intersected at almost right angles. The intersected angle of the axes is particularly preferred in the range of 70 degrees to 110 degrees. However, in the case that the two films having negative and positive birefringences are arranged on both sides of the liquid crystal cell (see FIG. 2), the angle of the axes may be not restricted as above. Further, such arrangement is preferred because right and left viewing angles are apt to almost equal each other.

Further, the film or the composite film may have function of a phase difference film and that of a protective film for protecting the cell side of the polarizing sheet. Such phase difference film having the protective function enables decrease of production cost as well as enlargement of viewing angle.

Further, the film of the invention can be a non-self supporting film, and can be in the form of a layer formed by coating a coating solution or a melted copolymer on a substrate and the like. The uniaxially stretched film of the invention includes not only a precise uniaxial film, but also any film showing essentially uniaxial property having further a biaxial property is imparted. Hence, the film of the invention may be such a film as prepared by laterally uniaxial stretch by means of tentering method and by longitudinally uniaxial stretch utilizing difference between peripheral speed. Such stretch methods include both restricting occurrence of natural shrinkage in a stretching procedure and not restricting the occurrence.

The film of a polymer having a positive birefringence employable for the invention is preferably a colorless film having optical transmittance of not less than 70%. Further, the transmittance is more preferably not less than 90%.

The intrinsic birefringence ($\Delta n^\circ$) means a birefringence when molecules of a polymer are ideally orientated in one direction and is approximately expressed by the following formula:

$$\Delta n^\circ = \frac{2\pi}{9} \cdot \frac{dN}{M} \cdot \frac{(n_a^2 + 2)^2}{n_a} \Delta \alpha$$

wherein "$\pi$" represents the ratio of the circumference to its diameter, "d" represents density, "N" represents Avogadro number "$n_n$" represents average refraction index, and "$\Delta \alpha$" is represented by the following formula:

$$\Delta \alpha = \alpha_1 - \alpha_2$$

wherein "$\alpha_1$" represents the polarizability per monomer constituting a polymer in the direction of molecular axis of the polymer and "$\alpha_2$" represents the polarizability per monomer constituting a polymer in the direction perpendicular to the molecular axis of the polymer. A film having a negative or positive birefringence is generally obtained by uniaxially stretching a polymer having a negative or positive intrinsic birefringence.

Examples of the above polymer having a positive intrinsic birefringence include polycarbonate, polyallylate, polyether sulfone, polyphenylene sulfide, polyphenylene oxide, polyallylsulfone, polyamideimide, polyimide, polyolefin, polyvinyl chloride, cellulose and polyester (e.g., polyethylene terephthalate). Particularly, polycarbonate, polyallylate and polyester are preferred because of easiness of formation of a film having uniform surface by means of a solution casting. The above polymer may be a homopolymer, a copolymer, a derivative thereof or a blended composition comprising two or more kinds of the polymers.

The birefringent film of the invention made of a uniaxially stretched film of a copolymer having a negative intrinsic birefringence, preferably is a colorless film having optical transmittance of not less than 70%. Further, the transmittance more preferably is not less than 85%. The absolute value of the negative intrinsic birefringence preferably is not less than 0.02, more preferably is not less than 0.04. The orientated molecules of the stretched copolymer tend to relax in orientation with rise of temperature in the preparation procedure of a liquid crystal display or during display thereof. To prevent the relaxation, it is preferred that the glass transition temperature (Tg) of the film is not lower than 110° C., more preferably not lower than 115° C.

The uniaxially stretched film having a negative intrinsic birefringence preferably has a retardation value of 125 to 1200 nm, and more preferably 380 to 700 nm. The retardation value generally determined depending on the thickness and the conditions of stretching. Further, the uniaxially stretched film having a negative birefringence preferably has a thickness of 10 μm to 1 mm, and more preferably 40 to 100 μm.

Examples are given below, but these examples by no means restrict the invention.

SYNTHETIC EXAMPLE 1

[Synthesis of the compound Ps-3 described previously]

In a three-necked flask equipped with a stirrer and a reflux condenser, 1.5 g of polysodium acrylate (number-average molecular weight: 15,000) dissolved in 600 ml of distilled water and 2 g of sodium hydrogensulfite were placed, and were heated to reach a temperature of 65° C. with stirring in the presence of a nitrogen gas. Further, 21 g of styrene/butadiene copolymer (22/78 by weight; NS-310S available from Nippon Geon Co., Ltd.) and 10 weight % of a mixture of styrene (168 g) and acrylonitrile (42 g) were added to the mixture in the flask and were stirred violently under heating. Subsequently, 0.9 g of benzoyl peroxide dissolved in 31.5 ml of isopropyl alcohol was added to the mixture, was similarly stirred for 1 hour, and the remainder of the above monomers (styrene and acrylonitrile) was dropwise added at a fixed addition speed over 2 hours to the mixture in the flask. After the addition was complete, the reaction mixture was allowed to stand for 1 hour. Then, to the reaction mixture, 10 ml of an ethanol solution of 0.9 g of benzoyl peroxide was added, and after 2 hours, 10 ml of a ethanol solution of 0.6 g of benzoyl peroxide was further added. The mixture in the flask was heated to reach a temperature of 75° C. and the temperature was kept for 4 hours.

After cooling of the reaction mixture, the resultant dispersion was filtered by centrifugation to collect the residue (the resultant polymer). The residue was sufficiently washed using water and methanol, was dried at 60° C. for 4 hours to give the above compound Ps-3 (225 g).

The obtained polymer had a number-average molecular weight of 350,000 (measured by gel permeation chromatography) and a moisture content of 0.65 weight %. 10% Methylene chloride solution of the polymer was transparent.

Other polymers (Ps-1 to Ps-22) described previously were also synthesized in the same manner as above.

SYNTHETIC EXAMPLE 2

[Synthesis of the compound Pe-3 described previously] (graft polymerization of styrene/acrylonitrile (80/20; by weight) to styrene/butadiene copolymer (80/20; by weight); the styrene/butadiene copolymer: 10 weight % based on the amount of the monomer)

In a three-necked flask equipped with a stirrer and a reflux condenser, 2.2 g of sodium oleate, 0.28 g of sodium hydrogensulfite, 48.4 g of styrene/butadiene latex (solid content: 40%; LX110 available from Nippon Geon Co., Ltd.) and 550 g of distilled water were placed, and were heated to reach a temperature of 65° C. with stirring in a nitrogen gas atmosphere. Further, 0.32 g of potassium persulfate dissolved in 20 g of distilled water was added to the mixture in the flask. Subsequently, both a mixture of styrene (176 g) and acrylonitrile (44 g) and 50 g of aqueous solution of 0.16 g of potassium persulfate were dropwise added to the mixture in the flask at the same time, and the additions were continued at a fixed addition rate for 10 hours.

After the addition was complete, the reaction mixture was stirred at 65° C. for 1 hour. Further, to the reaction mixture, 20 g aqueous solution of 0.16 g of potassium persulfate was added, and was further stirred for 3 hours.

After cooling of the reaction mixture, the resultant latex was filtered, was aggregated by dropwise adding sulfuric acid aqueous solution of 0.05 mole/litter for 30 minutes, and was subjected to heat treatment.

The resultant aggregated mixture was filtered by centrifugation to collect the residue (the resultant polymer). The residue was sufficiently washed using a great amount of water and methanol. It was confirmed that the amount of water and methanol of the residue (polymer) was about three times as much as the solid content (polymer) of the residue.

The resultant polymer was dried in the same manner as that of the polymer obtained by the suspension polymerization, and the moisture content of the polymer was measured with the elapse of time. It took 5 days (about 120 hours) to reach the moisture content level of the polymer (Synthetic example 1) by the suspension polymerization. The obtained polymer had a number-average molecular weight of 380,000 (measured by gel permeation chromatography). 10% methylene chloride solution of the polymer was transparent.

EXAMPLE 1 and COMPARISON EXAMPLE 1

170 g of each of the polymers shown in Table 1, which contained the graft polymer of the invention, was dissolved in 830 g of methylene chloride to prepare a solution. The solution was casted on a glass plate, allowed to stand at room temperature for 5 minutes, and dried by the application of a warm air of 45° C. for 20 minutes to form a film having a thickness of 100 μm. After the film was peeled from the glass plate, the peeled film was sticked on a frame. The sticked film was dried 70° C. for 1 hour and further 110° C. for 15 hours, and then the dried film was uniaxially stretched in 200 percents of stretch using a commercially available tensile strength tester at 115° C., to prepare films having a negative birefringence (samples No. 1 to 12).

The resultant samples were evaluated in the following manner:

1) Brittleness

Figure 4:
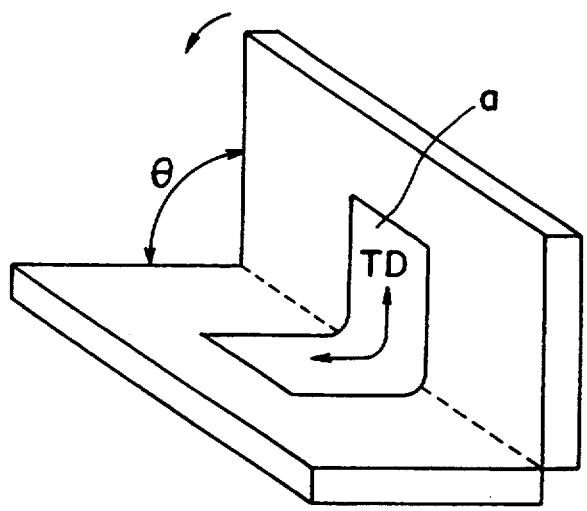
FIG. 4 shows the condition in the course of bending the sample amounted on a tester for brittleness.

Each of the samples (films) was so cut as to have size of 10 mm in the stretched axis direction (MD) and 35 mm in the direction (TD) intersected at right angles to the stretched axis to prepare a test piece. The test piece was gradually bended so as to form a crease in the direction parallel to the MD as shown in FIG. 4. The angle when the test piece was broken by the bending was measured. In the case of no breakdown of the test piece, the angle was regarded as 0 degree.

The angle (θ) preferably is less value, and is required to be not more than 10 degree in practice.

2) Suitability for punching

Figure 5:
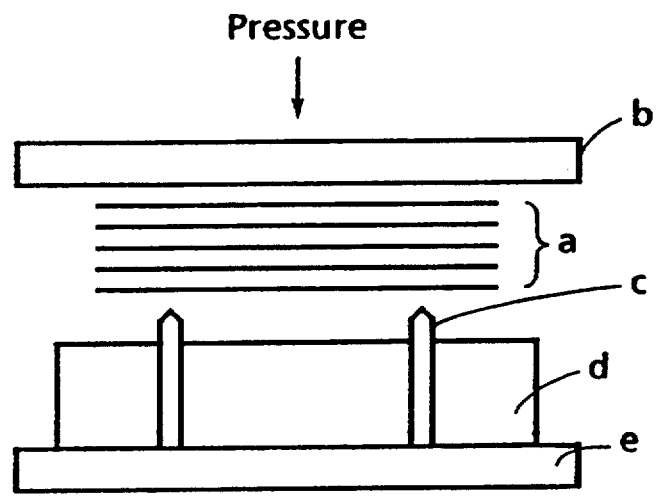
FIG. 5 is a sectional view of Tomson punching machine.

Prepared was Tomson punching machine comprises a pressing plate b (made of polyvinyl chloride), an edge made of steel "c", a mat made of rubber "d" and a base made of wood "e", which is shown in FIG. 5. Using the Tomson punching machine having the mat "d" of 18 cm × 16 cm, the five test pieces were superposed in such a manner that the MD was at 45 degree to a long side of the mat of the punching machine, and were punched. The test pieces were observed as to cracks produced inside from four corners of the test pieces, and a length of the longest crack of cracks which occurred in the fifth test piece from a pressing plate of the punching machine was measured.

The length is required to be not more than 5 mm in practice.

3) Heat resistance

The test piece punched in the above (2) was sticked on a glass plate using an adhesive, and was arranged between two polarizing plates arranged in crossed nicols in such a manner that the MD of the test piece was placed at 45 degree to a polarizing axis. Then, transmission of the test piece was measured and its retardation was determined from its wavelength dependence. Further, the test pieces was subjected to heat treatments of 90° C. for four hours and 70° C. for 120 hours, and its retardation was determined, again. Thus, the lowering rate (%) of the retardation was calculated from the difference ((After heat treatment) (Before heat treatment)) between the retardations.

The rate is required to be not more than 3% in practice, and further it is required not to crack in the heat treatment.

The results of the above evaluation are set forth in Table 1.

TABLE 1

| Sample No. | Polymer No. | Brittleness (°) | Suitability for punching (mm) | Heat resistance (%) | Crack |
|---|---|---|---|---|---|
| Example 1 | | | | | |
| 1 | Ps-1 | 4 | 1.2 | 1.5 | none |
| 2 | Ps-2 | 7 | 1.8 | 0.9 | none |
| 3 | Ps-3 | 1 | 0.7 | 1.3 | none |
| 4 | Ps-4 | 9 | 1.2 | 0.7 | none |
| 5 | Ps-9 | 0 | 1.4 | 1.4 | none |
| 6 | Ps-10 | 0 | 1.5 | 0.9 | none |
| 7 | Ps-11 | 0 | 2.2 | 2.0 | none |
| 8 | Pe-3 | 2 | 0.7 | 1.1 | none |
| Comparison Ex. 1 | | | | | |
| 9 | Polystyrene | 40 | 15 | 2.5 | observed |
| 10 | Styrene/acry- | 32 | 10 | 1.7 | observed |

TABLE 1-continued

| Sample No. | Polymer No. | Brittle-ness (°) | Suitability for punching (mm) | Heat resistance (%) | Crack |
|---|---|---|---|---|---|
| 11 | lonitrile copolymer (a) Styrene/acrylonitrile copolymer (b) | 25 | 8 | 1.3 | observed |
| 12 | Styrene/acrylonitrile butadiene random copolymer (c) | 20 | 8 | 1.5 | observed |

Note:
Copolymer (a): Styrene (St)/acrylonitrile (AN) = 75/25
Copolymer (b): ST/AN = 40/60
Copolymer (c): St/AN/butadiene (BD) = 68/29/3

The films of the invention are apparently improved in brittleness, suitability for punching and heat resistance, compared with other styrene-type copolymer.

EXAMPLE 2 and COMPARISON EXAMPLE 2

Each of the polymers shown in Table 1 was dissolved in methylene chloride to prepare a solution (concentration: 20 weight %). The solution was casted on a stainless belt, the casted layer was continuously peeled off, and then the peeled layer was dried to form a film. The obtained film was uniaxially stretched using rolls having different periphery speeds at 111° C., to prepare a roll film having a negative birefringence of a retardation value of 430 nm. An adhesive sheet was sticked on one side of the obtained film and a protective film made of polyvinyl chloride was laminated on the opposite side of the film to prepare samples (No. 1 to 12).

The resultant samples were evaluated in the same manner as Example 1 and Comparison Example 1. It was confirmed that the films comprising the graft copolymers of Example 2 (samples No. 1 to 8) were improved in brittleness, suitability for punching and heat resistance, compared with Comparison Example 2 (samples No. 9 to 12).

EXAMPLE 3

Polycarbonate having a weight-average molecular weight of of 100,000 was dissolved in methylene chloride to prepare a solution (concentration: 20 weight %). The solution was casted on a stainless belt, the casted layer was continuously peeled off and then the peeled layer was dried to form a polycarbonate film. The obtained film was uniaxially stretched using rolls having different periphery rates at 170° C., to prepare a roll film having a retardation value of 430 nm. An adhesive sheet was sticked on one side of the obtained film and a protective film made of polyvinyl chloride was laminated on the opposite side of the film.

Figure 6:
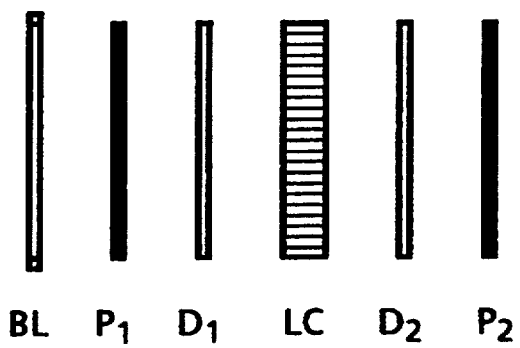
FIG. 6 shows a structure of the liquid crystal cell "WD-A-550".
Figure 7:
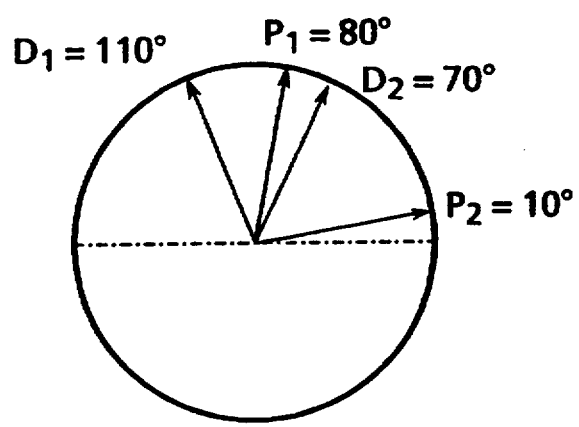
FIG. 7 shows a structure of optical axes of the liquid crystal cell "WD-A-550" viewed from the front.

Subsequently, prepared was a phase difference film of the personal word-processor "WD-A550" (manufactured by Sharp Corporation) comprising a backup light BL, a polarizing sheet $P_1$, a rear phase difference film $D_1$, a liquid crystal cell LC, a front phase difference film $D_2$ and a polarizing sheet $P_2$, as shown in FIG. 6. The phase difference films of the personal word-processor were removed from the front and the rear of the word-processor. The above polycarbonate film was mounted in the word-processor in place of the rear phase difference film and the graft copolymer film of the invention of Example 2 was mounted in the wordprocessor in place of the front phase difference film. The optical axis of each of the films was arranged in the same manner as that of the above personal word-processor where the phase difference film was not remove, as shown in FIG. 7. The obtained crystal liquid panel was measured as to contrast ratio and coloring viewed from the front in the driving condition and the undriven condition, and the angle (viewing angle) when the contrast ratio was not less than 2.

COMPARISON EXAMPLE 3

As for the above liquid crystal panel of Example 3 where the above polycarbonate films were mounted in the word-processor in place of the front and rear phase difference films, its display characteristics were evaluated.

The result of evaluation of Example 3 and Comparison Example 3 are set forth in Table 2.

TABLE 2

| Panel No. | Polymer No. | Contrast ratio | Coloring (white) | Viewing angle (degree) |
|---|---|---|---|---|
| Example 3 | | | | |
| 1 | Ps-1 | 4.9 | none | −61 to 59 |
| 2 | Ps-2 | 4.8 | none | −60 to 59 |
| 3 | Ps-3 | 5.1 | none | −61 to 62 |
| 4 | Ps-4 | 4.7 | none | −59 to 59 |
| 5 | Ps-9 | 4.2 | none | −58 to 59 |
| 6 | PS-10 | 4.5 | none | −57 to 59 |
| 7 | Ps-11 | 4.9 | none | −60 to 60 |
| Com. Ex. 3 | | | | |
| 9 | Polycarbonate | 5.3 | none | −39 to 41 |

As shown in Table 2, the coloring viewed from the front were excellent in all panels, so that all panels showed a distinct black-and-white image, but as to viewing angle the panels of Example 3 using the graft polymers of the invention were extremely wide, as compared with those of Comparison Example 3.

EXAMPLE 4 and COMPARISON EXAMPLE 4

170 g of each of the polymers shown in Table 3, which contain the graft polymer of the invention, was dissolved in 830 g of methylene chloride to prepare a solution. The solution was casted on a glass plate, allowed to stand at room temperature for 5 minutes, and dried by the application of a warm air of 45° C. for 20 minutes to form a film having a thickness of 100 μm. After the film was peeled from the glass plate, the peeled film was sticked on a frame. The sticked film was dried 70° C. for 1 hour and further 110° C. for 15 hours, and then the dried film was uniaxially stretched in 200 percents of stretch using a commercially available tensile strength tester at 115° C., to prepare films having a negative birefringence (samples No. 1 to 12).

The graft copolymers of the invention shown in Table 3 were prepared by grafting the monomer (B) to the polymer (A) having a number-average particle size indicated in Table 3.

The resultant samples were evaluated in the following manner:

1) Brittleness

Each of the samples (films) was so cut as to have size of 10 mm in the stretched axis direction (MD) and 35 mm in the direction (TD) intersected at right angles to the stretched axis to prepare a test piece. The test piece was gradually bended so as to form a crease in the direction parallel to the MD as shown in FIG. 4. The angle when the test piece was broken by the bending was measured. The test piece was bended from 180 to 0 degrees (angle ($\theta$)) the for 1 or 3 second, and the time (1 or 3 sec.) when was broken was observed. Further, an angle angle ($\theta$) of the when the test piece was broken by the bending was measured. In the case of no breakdown of the test piece, the angle angle ($\theta$) of the was regarded as 0 degree.

The angle ($\theta$) preferably is less value, and is required to be not more than 10 degree in the bending for 3 seconds in practice.

2) Suitability for punching

The stability was evaluated in the same manner as that of Example 1.

3) Heat resistance

The heat resistance was evaluated in the same manner as that of Example 1.

The results of the above evaluation are set forth in Table 3.

film having a negative birefringence of a retardation value of 430 nm. Thus, the roll films (Samples No. 1 to 12) were prepared.

The resultant samples were evaluated in the same manner as Example 4 and Comparison example 4. It was confirmed that the films comprising the graft copolymers of Example 5 (samples 1 to 8) were improved in brittleness, suitability for punching and heat resistance, as compared with Comparison Example 5 (samples 9 to 12).

EXAMPLE 6

Polycarbonate having a weight-average molecular weight of 100,000 was dissolved in methylene chloride to prepare a solution (concentration: 20 weight %). The solution was casted on a stainless belt, the casted layer was continuously peeled off and then the peeled layer was dried to form a polycarbonate film. The obtained film was uniaxially stretched using rolls having different periphery speeds at 170° C., to prepare a roll film having a retardation value of 430 nm.

Subsequently, phase difference films of the personal word-processor "WD-A550" (manufactured by Sharp Corporation), as shown in FIG. 6 were removed from the front and the rear of the word-processor. The above polycarbonate film was mounted in the word-processor in place of the rear phase difference film ($D_1$) and the styrene type copolymer film of Example 5 was mounted in the word-processor in place of the front phase difference film ($D_2$). The optical axis of each of the films was arranged in the same manner as that of the above personal word-processor where the phase difference film

TABLE 3

| Sample No. | Polymer No. Particle size (μm) | Brittl- ness (°) 3" | Brittl- ness (°) 1" | Suitability for punching (mm) | Heat resis- tance (%) | Crack |
|---|---|---|---|---|---|---|
| Example 4 | | | | | | |
| 1 | Pe-1 (0.09) | 2 | 10 | 1 | 1.5 | none |
| 2 | Pe-2 (0.09) | 8 | 10 | 2 | 0.9 | none |
| 3 | Pe-3 (0.09) | 0 | 5 | 1 | 1.3 | none |
| 4 | Pe-4 (0.09) | 7 | 10 | 1 | 0.7 | none |
| 5 | Pe-5 (0.25) | 0 | 0 | 1 | 1.5 | none |
| 6 | Pe-6 (0.13) | 0 | 5 | 1 | 1.4 | none |
| 7 | Pe-7 (0.13) | 0 | 10 | 1 | 0.9 | none |
| 8 | Pe-8 (0.18) | 0 | 5 | 2 | 2.0 | none |
| Comparison Ex. 4 | | | | | | |
| 9 | Poly- styrene | 40 | 60 | 15 | 2.5 | observed |
| 10 | Styrene/ acrylonitrile copolymer (a) | 32 | 40 | 10 | 1.7 | observed |
| 11 | Styrene/ acrylonitrile copolymer (b) | 25 | 40 | 8 | 1.3 | observed |
| 12 | Styrene/ acrylonitrile butadiene random copolymer (c) | 20 | 30 | 8 | 1.5 | observed |

Note:
Copolymer (a): Styrene (St)/acrylonitrile (AN) = 75/25
Copolymer (b): ST/AN = 40/60
Copolymer (c): St/AN/butadiene (BD) = 68/29/3

The films of the invention are apparently improved in brittleness, suitability for punching and heat resistance.

EXAMPLE 5 and COMPARISON EXAMPLE 5

Each of the polymers shown in Table 3 was dissolved in methylene chloride to prepare a solution (concentration: 20 weight %). The solution was casted on a stainless belt, the casted layer was continuously peeled off and then the peeled layer was dried to form a film. The obtained film was uniaxially stretched using rolls having different periphery rates at 115° C., to prepare a roll was not removed, as shown in FIG. 7. The obtained crystal liquid panel was measured as to contrast ratio and coloring viewed from the front in the driving condition and the undriven condition, and angle (viewing angle) when the contrast ratio was not less than 2.

COMPARISON EXAMPLE 6

As for the above liquid crystal panel of Example 6 where the above polycarbonate films were mounted in the word-processor in place of the front and rear phase difference film, its display characteristics were evaluated.

The result of evaluation of Example 6 and Comparison Example 6 are set forth in Table 4.

TABLE 4

| Panel No. | Polymer No. | Contrast ratio | Coloring (white) | Viewing angle (degree) |
|---|---|---|---|---|
| Example 6 | | | | |
| 1 | Pe-1 | 5.5 | none | −60 to 61 |
| 2 | Pe-2 | 5.3 | none | −62 to 63 |
| 3 | Pe-3 | 5.6 | none | −62 to 63 |
| 4 | Pe-4 | 5.3 | none | −61 to 64 |
| 5 | Pe-5 | 5.0 | none | −60 to 62 |
| 6 | Pe-6 | 5.8 | none | −60 to 61 |
| 7 | Pe-7 | 5.2 | none | −62 to 65 |
| 8 | Pe-8 | 5.8 | none | −60 to 62 |
| Com. Ex. 6 | | | | |
| 9 | Polycarbonate | 5.3 | none | −39 to 41 |

As shown in Table 4, the coloring viewed from the front were excellent in the all panels, so that all panels showed a distinct black-and-white image, but as to viewing angle the panels of Example 6 using the graft polymers of the invention were extremely wide, as compared with that of Comparison Example 6.

EXAMPLE 7

The procedure of Example 4 was repeated except for using polymers and antioxidants shown in Table 5 in place of polymers in Table 3 to prepare samples of uniaxially stretched films having a negative birefringence. The numbers of polymers and antioxidants were described previously.

The brittleness of each of the samples was evaluated in the same manner as in Example 4. Further, after the samples were preserved in a thermostat of 85° C. for four days, the brittleness was evaluated in the above manner.

The results of the above evaluation are set forth in Table 5.

TABLE 5

| Sample No. | Polymer | Antioxidant | | Brittleness (°) | | Brittleness (after 4 days) (°) | |
|---|---|---|---|---|---|---|---|
| Example 7 | No. | No. | (g) | 3″ | 1″ | 3″ | 1″ |
| 1 | Pe-3 | S-2 | 0.85 | 0 | 3 | 0 | 5 |
| 2 | Pe-3 | S-3 | 0.85 | 0 | 3 | 0 | 6 |
| 3 | Pe-4 | S-4 | 1.70 | 5 | 8 | 5 | 10 |
| 4 | Pe-5 | S-7 | 2.00 | 0 | 0 | 0 | 5 |
| 5 | Pe-8 | S-2 | 0.85 | 0 | 2 | 0 | 0 |
| 6 | Pe-3 | S-2 | 0.43 | 0 | 2 | 0 | 0 |
| | | S-11 | 0.42 | | | | |
| 7 | Pe-3 | — | — | 0 | 5 | 25 | 30 |
| 8 | Pe-8 | — | — | 0 | 5 | 15 | 30 |

Note:
Antioxidant number (No.) stands for that of antioxidant examples previously described.

As shown in Table 5, the phase difference films containing the antioxidants (Samples 1–6) were not deteriorated in brittleness after the preservation for 4 days, but the films containing the antioxidants (Samples 7 and 8 for comparison) of the invention are apparently deteriorated in brittleness with the elapse of time.

EXAMPLE 8

Figure 9:
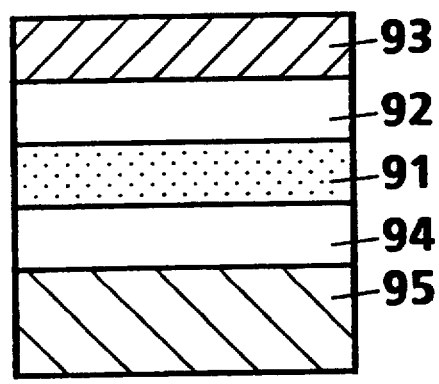
FIG. 9 is a sectional view of one embodiment of the composite comprising a polarizing sheet, an adhesive layer, a phase difference film, an adhesive layer and the glass plate.

Using the birefringent films (phase difference films) of Example 4 and 7 and adhesives of polyacrylate type shown in Table 6, the following composites were prepared, as shown in FIG. 9. The composite comprises the phase difference film 91, the polarizing sheet 93 through the adhesive layer 92 provided on the one side of the film 91, and the glass plate (thickness: 1.1 mm) 95 through the adhesive layer 94 provided on the other side of the film 91. The retardation of each of the composites (No. 1 to 8) was measured at a location of 5 mm from the edge and at the central portion.

Further, after the samples were preserved in a thermostat of 85° C. for four days, the retardation was evaluated in the above manner. The difference ((After 4 days)−(Initial)) between the initial retardation and that after the reservation was calculated.

The results of the above evaluation are set forth in Table 6.

TABLE 6

| Composite No. | Film No. | Antioxidant in adhesive layer 92 | | Antioxidant in adhesive layer 94 | | Retardation | |
|---|---|---|---|---|---|---|---|
| | | No. | (g/m²) | No. | (g/m²) | Edge | Central |
| 1 | No. 3 (Ex. 4) | S-2 | 0.4 | — | — | +3 | +1 |
| 2 | No. 3 (Ex. 4) | S-2 | 0.2 | S-2 | 0.2 | +2 | +1 |
| 3 | No. 8 (Ex. 4) | S-2 | 0.3 | S-2 | 0.3 | +2 | +1 |
| 4 | No. 1 (Ex. 7) | — | — | — | — | +3 | +1 |
| 5 | No. 5 (Ex. 7) | S-2 | 0.2 | S-2 | 0.2 | +1 | +1 |
| 6 | No. 6 (Ex. 7) | — | — | — | — | +2 | +2 |
| 7 | No. 3 (Ex. 4) | — | — | — | — | +12 | −8 |
| 8 | No. 8 (Ex. 4) | — | — | — | — | +11 | −6 |

As shown in Table 6, in the composites (No. 1 to 3) that the adhesive layers contained an antioxidant though the films contained one, increase of retardation at the edge after the preservation was sufficiently depressed. Further, the composites (No.4 to 6) that the films contained an antioxidant and further the adhesive layers contain an antioxidant, increase of retardation at the edge after the preservation was more depressed.

EXAMPLE 9

The procedures of Example 6 were repeated except for using the phase difference films shown in Table 7 in place of the rear phase difference film (D$_1$ shown in FIG. 6) and the front phase difference film (D$_2$) and for interposing the adhesive layers of polyacrylate type adhesion containing the antioxidants shown in Table 7 between P$_1$ and D$_1$, D$_1$ and LC, LC and D$_2$, and D$_2$ and P$_2$, whereby the crystal liquid panels (No. 1 to 6) were prepared.

The contrast ratio viewed from the front was measured as to the resultant crystal liquid panels and the panels after preservation in a thermostat of 60° C. for 120 hours.

The results of the above measurement are set forth in Table 7.

TABLE 7

| Panel No. | Film No. | | | Antioxidant in adhesive layer (LC-D$_2$) | | Antioxidant in adhesive layer (P$_2$-D$_2$) | | Contrast Initial/ After 60 °C., 120 hr |
|---|---|---|---|---|---|---|---|---|
| | D$_1$ | D$_2$ | | No. | (g/m²) | No. | (g/m²) | |
| 1 | PC | No 3 | (Ex.4) | S-2 | 0.4 | — | — | 5.4/5.5 |
| 2 | PC | No 8 | (Ex.4) | S-2 | 0.3 | S-2 | 0.3 | 5.6/5.4 |

TABLE 7-continued

| Panel No. | Film No. D$_1$ | Film No. D$_2$ | | Antioxidant in adhesive layer (LC-D$_2$) No. | Antioxidant in adhesive layer (LC-D$_2$) (g/m$^2$) | Antioxidant in adhesive layer (P$_2$-D$_2$) No. | Antioxidant in adhesive layer (P$_2$-D$_2$) (g/m$^2$) | Contrast Initial/ After 60 °C., 120 hr |
|---|---|---|---|---|---|---|---|---|
| 3 | PC | No 1 | (Ex.7) | — | — | — | — | 5.8/5.7 |
| 4 | PC | No 5 | (Ex.7) | S-2 | 0.3 | S-2 | 0.3 | 5.5/5.6 |
| 5 | PC | No 6 | (Ex.7) | — | — | — | — | 5.6/5.3 |
| 6 | PC | No 3 | (Ex.4) | — | — | — | — | 5.5/4.1 |

Note:
PC: Polycarbonate

As shown in Table 7, the liquid crystal panels (No. 1, 2 and 4) which had the adhesive layers containing an antioxidant, and the panels (No. 3, 4 and 5) which had the films containing an antioxidant, all did not indicate decrease of the contrast.

EXAMPLE 10

170 g of each of the graft polymers Pe-3 and Pe-9 described previously was dissolved in 830 g of methylene chloride to prepare a solution. The solution was casted on a glass plate, was allowed to stand at room temperature for 5 minutes, and was dried by application of a warm air of 45° C. for 20 minutes to form a film having a thickness of 100 μm. After the film was peeled from the glass plate, the peeled film was sticked on a frame. The sticked film was dried 70° C. for 1 hour and further 110° C. for 15 hours, and then the dried film was uniaxially stretched with variation of percents of stretch using a commercially available tensile strength tester at 115° C., to prepare three kinds of roll films having a negative birefringence of retardation values of 430, 440 and 570 nm (samples No. 1 and 2)

The resultant samples were evaluated in the following manner:

1) Brittleness

The brittleness was evaluated in the same manner as that of Example 1.

2) Heat resistance

Each of the films obtained in Example 10 was sticked on a glass plate using an adhesive in such a manner that the MD of the film was arranged parallel to the glass plate. On the film, a polarizing plate was sticked in such a manner that a polarizing axis was arranged at 45 degree to the MD of the film. Then, the resultant composites was allowed to stand at 90° C., 80%RH for about 300 hours, and it was observed whether cracks took place in the film or not.

COMPARISON EXAMPLE 7

Polystyrene was dissolved in methylene chloride to prepare a solution (concentration: 20 weight %). The solution was casted on a stainless belt, the casted layer was continuously peeled off and then the peeled layer was dried to form a film. The obtained film was uniaxially stretched with variation of percent of stretch using rolls having different periphery rates at 111° C., to prepare three kinds of roll film having retardation values of 430, 440 and 570 nm. The resultant film (sample No. 3) was evaluated in the same manner as in Example 10.

The results of the above evaluation are set forth in Table 8.

TABLE 8

| Sample No. | Polymer No. | Brittleness (°) | Heat resistance (crack) |
|---|---|---|---|
| Example 10 | | | |
| 1 | Pe-3 | 0 | none |
| 2 | Pe-9 | 0 | none |
| Comparison Ex. 7 | | | |
| 3 | Polystyrene | 40 | observed |

EXAMPLE 11 and COMPARISON EXAMPLE 8

Polycarbonate having a weight-average molecular weight of 100,000 was dissolved in methylene chloride to prepare a solution (concentration: 20 weight %). The solution was casted on a stainless belt, the casted layer was continuously peeled off and then the peeled layer was dried to form a polycarbonate film. The obtained film was uniaxially stretched with variation of percent of stretch using rolls having different periphery rates at 170° C., to prepare three kinds of uniaxially stretched polycarbonate film having retardation value of 420, 430 and 440 nm.

The films of obtained Example 10 and Comparison Example 8 and the above polycarbonate film were prepared by adjusting retardation values in such a manner that the liquid crystal panel using the films showed the most contrast ratio. These films were mounted in the following word-processor so as to prepare the liquid crystal panels having the following constructions ([I], [II] and [III]). In more detail, the liquid crystal panels were prepared by using the STN liquid crystal cell of the personal word-processor "WD-A550" (manufactured by Sharp Corporation) or the personal computer "PC386NW" (manufactured by Seiko Epson Corporation) other than the birefringence films.

The obtained crystal liquid panels were measured as to contrast ratio viewed from the front in the driving condition and the undriven condition. The contrast ratio was determined by measuring Y value using a device for measuring luminance.

The ranges of viewing angle in the vertical direction and in the direction of right and left when the contrast ratio showed not less than 2 by the measurement of Y value, were measured.

The construction of the crystal liquid crystals ([I], [II] and [III]) are described below. The left side indicates the viewing side.

[I]
Protective film/Adhesive layer/Polarizing film/Adhesive layer/Phase difference film/Adhesive layer/Liquid crystal cell/Adhesive layer/Polarizing film

[II]
Protective film/Adhesive layer/Polarizing film/Adhesive layer/Phase difference film (1)/Adhesive layer/Phase difference film (2)/Adhesive layer/Liquid crystal cell/Adhesive layer/Polarizing film

[III]

Protective film/Adhesive layer/Polarizing film/Adhesive layer/Phase difference film (1)/Adhesive layer/Liquid crystal cell/Adhesive layer/Phase difference film (2)/Adhesive layer/Polarizing film The results of the above evaluation are set forth in Table 9.

TABLE 9

| Panel No. | Polymer No. | Panel/ Const- ruction | Retar- dation (nm) | Cont- rast | Viewing angle (degree) | |
|---|---|---|---|---|---|---|
| | | | | | Vertical | right-left |
| Example 11 | | | | | | |
| 1 | Pe-3 | Epson/[I] | 570 | 12:1 | 70 to −40 | 30 to −35 |
| 2 | Pe-3 | Sharp/[III] | (1) 430 (2) 430 | 14:1 | 75 to −42 | 32 to −38 |
| 3 | Pe-3 | Sharp/[III] | (1) 440 (2) 440 | 15:1 | 85 to −45 | 35 to −40 |
| Comparison Ex. 8 | | | | | | |
| 4 | PS | Epson/[I] | 570 | 12:1 | 70 to −38 | 28 to −32 |
| 5 | PC | Sharp/[III] | (1) 420 (2) 430 | 10:1 | 20 to −25 | 25 to −30 |
| 6 | PC | Sharp/[III] | (1) 430 (2) 440 | 12:1 | 25 to −35 | 30 to −35 |

Note:
PS: Polystyrene
PC: Polycarbonate
(1) in retardation: Phase difference film (1)
(2) in retardation: Phase difference film (2)

We claim:

1. A uniaxially stretched birefringent film having a negative birefringence, comprising a graft copolymer which is obtained by grafting, by addition-polymerization, at least one monomer selected from styrene and derivatives thereof to a polymer having an unsaturated double bond.

2. The birefringent film as defined in claim 1, wherein said polymer having an unsaturated double bond has a recurring unit derived from a monomer having a conjugated diene structure and has a glass transition temperature of not higher than 30° C.

3. The birefringent film as defined in claim 1, wherein said monomer comprises at least one monomer selected from styrene and derivatives thereof and at least one monomer selected from acrylonitrile and methacrylonitrile.

4. The birefringent film as defined in claim 1, wherein said addition-polymerization is performed by emulsion polymerization.

5. The birefringent film as defined in claim 1, wherein said addition-polymerization is performed by suspension polymerization in an aqueous medium.

6. The birefringent film as defined in claim 1, wherein said polymer having unsaturated double bond is in the form of particles having a number-average particle size of not more than 0.3 μm in emulsion.

7. A uniaxially stretched birefringent film having a negative birefringence, comprising a graft copolymer containing an antioxidant in an amount of 0.01 to 10 weight %, said graft copolymer being obtained by grafting, by addition-polymerization, at least one monomer selected from styrene and derivatives thereof to a polymer having an unsaturated double bond.

8. The birefringent film as defined in claim 7, wherein said polymer having unsaturated double bond is in the form of particles having a number-average particle size, in emulsion, of not more than 0.3 μm.

9. A liquid crystal display which comprises a liquid crystal cell comprising a pair of substrates provided with a transparent electrode and a twist-orientated nematic liquid crystal sealed therebetween, and at least two birefringent films comprising at least one uniaxially stretched film having a negative birefringence wherein;
said uniaxially stretched film having a negative birefringence comprises a graft copolymer which is obtained by grafting, by addition-polymerization, at least one monomer selected from styrene and derivatives thereof to a polymer having an unsaturated double bond.

10. The liquid crystal display as defined in claim 9, wherein said at least two birefringent films comprise at least one uniaxially stretched film having a positive birefringence and at least one uniaxially stretched film having a negative birefringence.

11. The liquid crystal display as defined in claim 9, wherein said polymer having an unsaturated double bond has a recurring unit derived from a monomer having a conjugated diene structure and has a glass transition temperature of not higher than 30° C.

12. The liquid crystal display as defined in claim 9, wherein said monomer comprises at least one monomer selected from styrene and derivatives thereof and at least one monomer selected from acrylonitrile and methacrylonitrile.

13. A liquid crystal display which comprises a liquid crystal cell comprising a pair of substrates provided with a transparent electrode and a twist-oriented nematic liquid crystal sealed therebetween, and at least two birefringent films comprising at least one uniaxially stretched film having a negative birefringence wherein;
said uniaxially stretched film having a negative birefringence comprising a graft copolymer containing an antioxidant in an amount of 0.01 to 10 weight graft copolymer being obtained by grafting, by addition-polymerization, at least one monomer selected from styrene and derivatives thereof to a polymer having an unsaturated double bond.

14. The liquid crystal display as defined in claim 13, wherein said uniaxially stretched film having a negative birefringence further has an adhesion layer containing an antioxidant in the amount of 0.01 to 10 g/m² on one side or both sides thereof.

* * * * *